United States Patent
Nobori et al.

(10) Patent No.: US 7,764,397 B2
(45) Date of Patent: Jul. 27, 2010

(54) IMAGE SYNTHESIZING APPARATUS AND IMAGE SYNTHESIZING METHOD

(75) Inventors: Kunio Nobori, Osaka (JP); Satoshi Sato, Osaka (JP); Kazutoyo Takata, Osaka (JP)

(73) Assignee: Panasonic Corporation, Osaka (JP)

( * ) Notice: Subject to any disclaimer, the term of this patent is extended or adjusted under 35 U.S.C. 154(b) by 768 days.

(21) Appl. No.: 11/785,699

(22) Filed: Apr. 19, 2007

(65) Prior Publication Data

US 2007/0188613 A1   Aug. 16, 2007

Related U.S. Application Data

(63) Continuation of application No. PCT/JP2006/313608, filed on Jul. 7, 2006.

(30) Foreign Application Priority Data

Aug. 8, 2005   (JP)   ............. 2005-229908

(51) Int. Cl.
G06F 15/00 (2006.01)
H04N 5/262 (2006.01)
(52) U.S. Cl. ........................ 358/1.2; 348/239
(58) Field of Classification Search ............. 358/1.2, 358/1.15, 1.14, 1.16, 1.13, 479, 1.18; 382/167, 382/254, 303; 348/239, 208.13; 347/9, 13, 347/49; 345/617, 582; 713/161, 170, 171; 400/62
See application file for complete search history.

(56) References Cited

U.S. PATENT DOCUMENTS

| | | | |
|---|---|---|---|
| 2004/0183925 | A1 | 9/2004 | Raskar et al. |
| 2004/0184667 | A1 | 9/2004 | Raskar et al. |
| 2005/0243175 | A1* | 11/2005 | Yamada et al. ........... 348/207.1 |

FOREIGN PATENT DOCUMENTS

| | | |
|---|---|---|
| JP | 2002-94860 | 3/2002 |
| JP | 2002-310935 | 10/2002 |
| JP | 2003-203237 | 7/2003 |
| JP | 2004-5509 | 1/2004 |
| JP | 2004-288185 | 10/2004 |
| JP | 2004-288186 | 10/2004 |
| JP | 2004-289829 | 10/2004 |

OTHER PUBLICATIONS

Yauhiro Mukaigawa et al., "*Photometric Image-Based Rendering ni yoru Kasou Shoumei Gazou no Seisei*", (Photometric Image-Based Rendering for Realizing Virtual Lighting Conditions in Image Synthesis), Jouhou Shori Gakkai Ronbun-shi, Computervision to Imagemedia, vol. 41, pp. 19-30, Dec. 2000.

Ammon Shashua, "*Geometry and Photometry in 3D Visual Recognition*", Ph.D. thesis, Dept. Brain and Cognitive Science, MIT, Nov. 1992.

* cited by examiner

*Primary Examiner*—Saeid Ebrahimi Dehkordy
(74) *Attorney, Agent, or Firm*—Wenderoth, Lind & Ponack, L.L.P.

(57) ABSTRACT

An image synthesizing apparatus which generates, from plural images with differing resolutions and lighting conditions, a synthesized image in which the resolution of the original image is improved and the lighting conditions match those of the original image. The image synthesizing apparatus includes: a camera which acquires an original image and plural reference images; a reference image conversion unit; a coefficient calculation unit which calculates a conversion coefficient used in performing linear combination on the plural converted reference images and generating an original image; and an image synthesizing unit.

13 Claims, 15 Drawing Sheets

FIG. 6
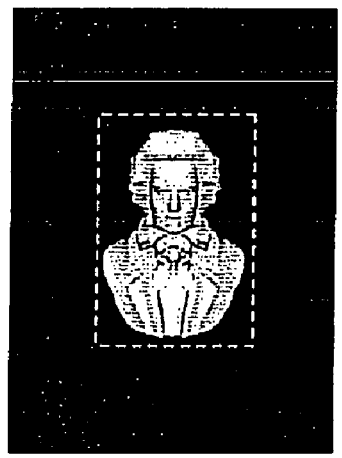
$$Rr = \begin{pmatrix} 1 & 0 & 0 \\ 0 & 1 & 0 \\ 0 & 0 & 1 \end{pmatrix}$$
$fr = 12.05 [mm]$
(a) Original Image Ir (768x1024 pixels)
$$R_0 = \begin{pmatrix} 1 & 0 & 0 \\ 0 & 1 & 0 \\ 0 & 0 & 1 \end{pmatrix} \quad R_1 = \begin{pmatrix} 1 & 0 & 0 \\ 0 & 1 & 0 \\ 0 & 0 & 1 \end{pmatrix} \quad R_2 = \begin{pmatrix} 1 & 0 & 0 \\ 0 & 1 & 0 \\ 0 & 0 & 1 \end{pmatrix}$$
$f_0 = 24.1 [mm] \quad f_1 = 24.1 [mm] \quad f_2 = 24.1 [mm]$
(b) Reference Images Ii (768x1024 pixels)

FIG. 7
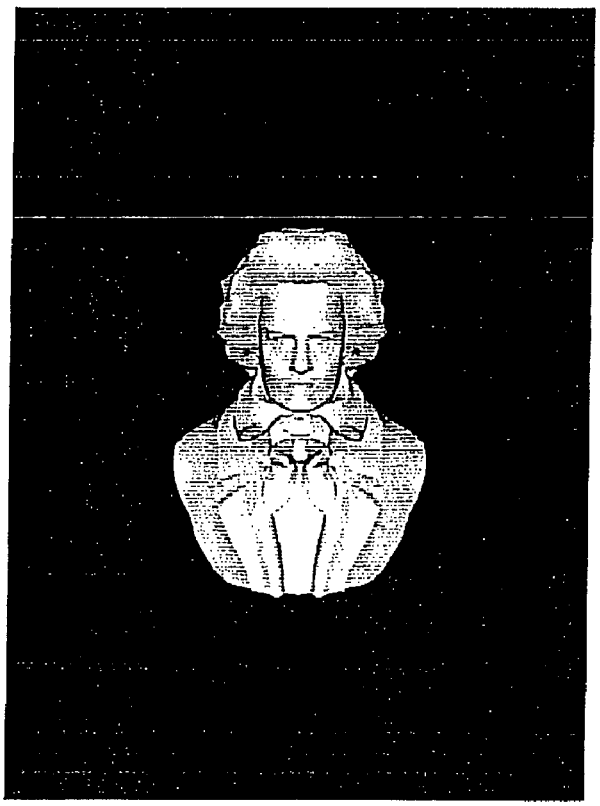
(a) Synthesized Image Io (1536x2048 pixels)
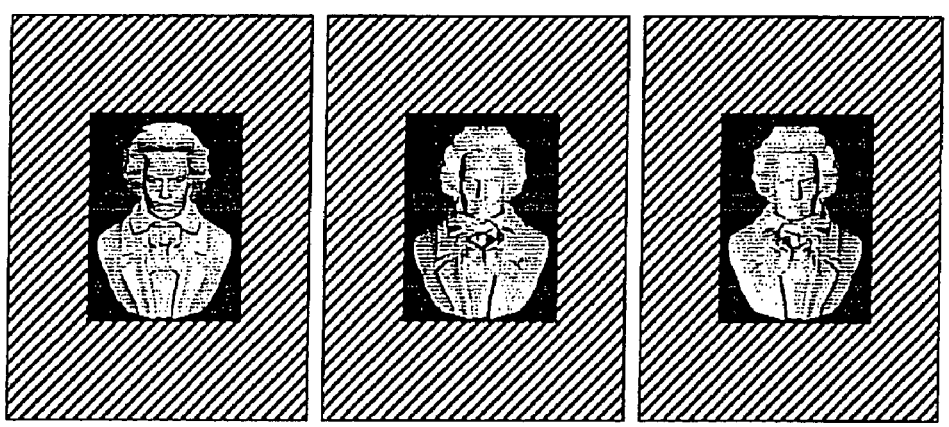
(b) Converted Reference Images Isi (reference images converted to same resolution as original image) (768x1024 pixels)

Converted Original Image Iro
(1536x2048 pixels)

Converted Reference Images Ioi (reference images converted to same resolution as converted original image) (1536x2048 pixels)

Linear-Converted Image Ip
(1536x2048 pixels)

FIG. 11
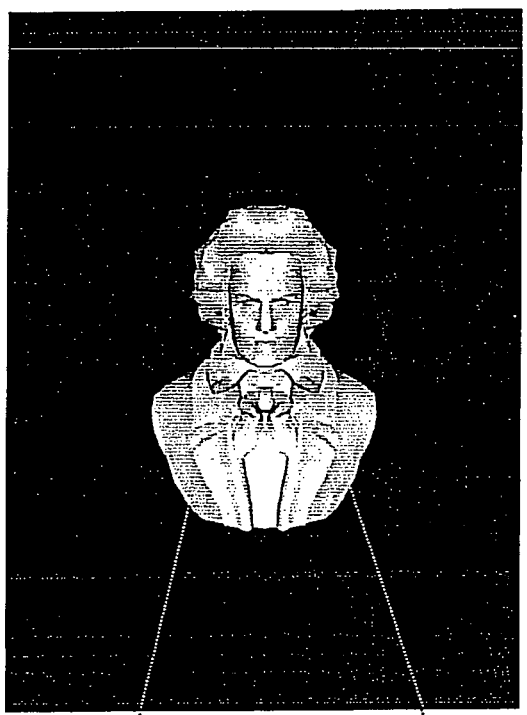 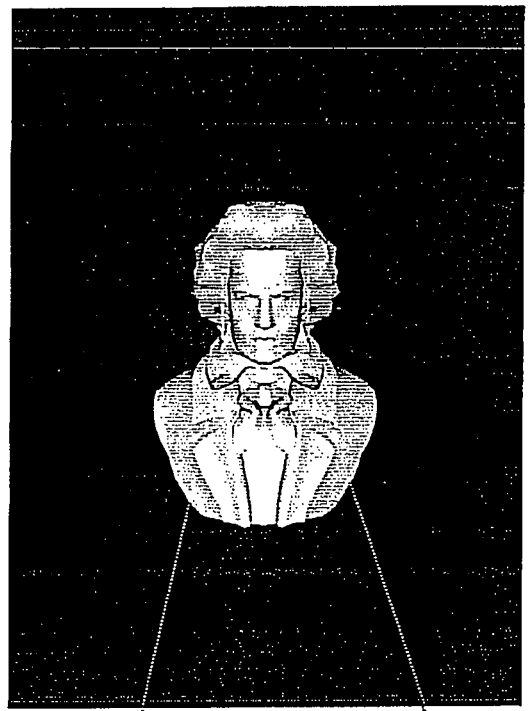
(a) Synthesized Image Io
(b) Enlarged Original Image Iro

FIG. 12
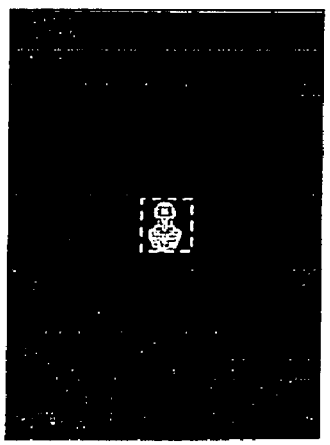
$$Rr = \begin{pmatrix} 1 & 0 & 0 \\ 0 & 1 & 0 \\ 0 & 0 & 1 \end{pmatrix}$$
$fr = 3.0125 [mm]$
(a) Original Image Ir (768x1024 pixels)
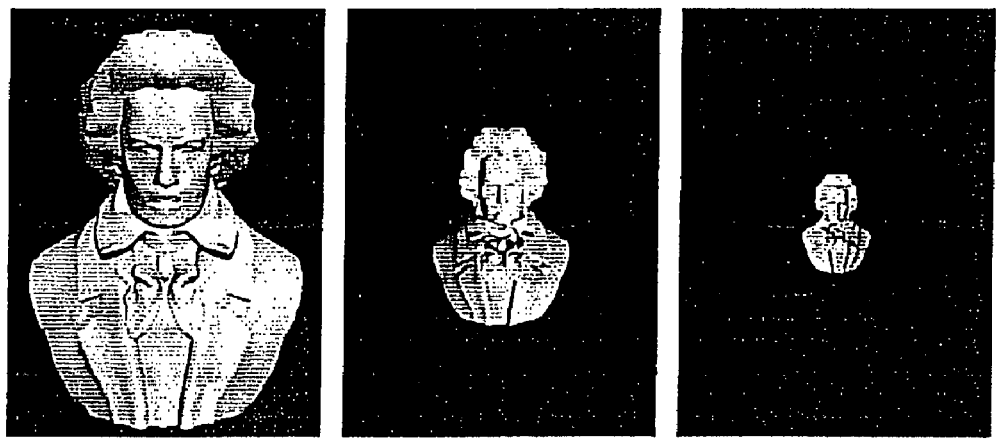
$$R_0 = \begin{pmatrix} 1 & 0 & 0 \\ 0 & 1 & 0 \\ 0 & 0 & 1 \end{pmatrix} \quad R_1 = \begin{pmatrix} 1 & 0 & 0 \\ 0 & 1 & 0 \\ 0 & 0 & 1 \end{pmatrix} \quad R_2 = \begin{pmatrix} 1 & 0 & 0 \\ 0 & 1 & 0 \\ 0 & 0 & 1 \end{pmatrix}$$
$f_0 = 24.1 [mm] \quad f_1 = 12.05 [mm] \quad f_2 = 6.025 [mm]$
(b) Reference Images Ii (768x1024 pixels)

FIG. 14
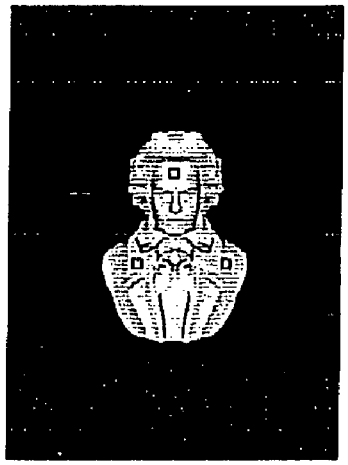
(a) Original Image Ir (768x1024 pixels)
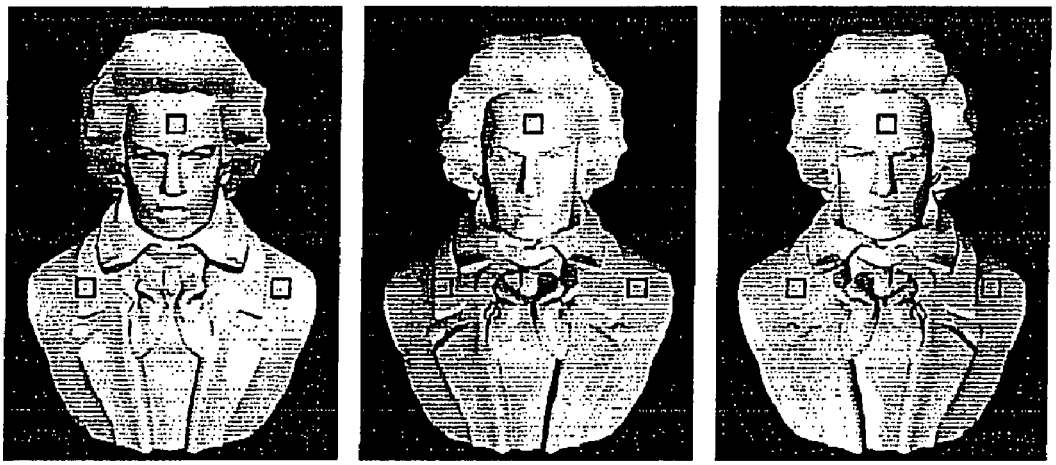
(b) Reference Images Ii (768x1024 pixels)

IMAGE SYNTHESIZING APPARATUS AND IMAGE SYNTHESIZING METHOD

CROSS REFERENCE TO RELATED APPLICATION

This is a continuation of PCT application No. PCT/JP2006/313608, filed Jul. 7, 2006, and designating the United States of America.

BACKGROUND OF THE INVENTION (1) Field of the Invention

The present invention relates to an image synthesizing apparatus which, having been inputted with plural images of differing spatial resolution (hereafter, referred to simply as "resolution") resulting from differences in enlargement ratios and so on at the time of capturing the images, generates a synthesized image of a higher resolution, and particularly relates to a technique for improving the resolution of an image using plural images between which exist differences in resolution and lighting conditions.

(2) Description of the Related Art

As an image synthesizing apparatus which synthesizes high-resolution images using conventional image processing technology, there exists an image synthesizing apparatus which, upon being provided with an original image, improves the resolution of the original image by superimposing, onto the original image, a high-resolution reference image in which the same object has been captured.

As a specific example of such an image synthesizing apparatus, Patent Reference 1 (Japanese Laid-Open Patent Application No. 2003-203237) discloses an image synthesizing apparatus which takes a low-resolution image and a high-resolution image in which the same object has been captured at short and long cycles respectively and performs a two-dimensional geometric conversion on the high-resolution image, thereby generating a high-resolution synthesized image which has the same composition as that of the low-resolution image.

Furthermore, as another image synthesizing apparatus, which generates a synthesized image with arbitrary lighting conditions from plural images with differing lighting conditions using conventional image processing technology, there exists an image synthesizing apparatus which generates a synthesized image with arbitrary lighting conditions using image linearization. "Images with differing lighting conditions" refers to images captured in situations where the position and distance of the light source from the object, the shape and number of light sources, and so on differ from image to image.

As a specific example of this type of image synthesizing apparatus, Patent Reference 2 (Japanese Laid-Open Patent Application No. 2004-5509) discloses an image synthesizing apparatus which uses plural images in which the face of the same person is captured at different angles and coordinate values of corresponding points between the images to generate an image having different lighting conditions relative to a certain angle. FIG. 1 shows examples of synthesized images generated by the conventional image synthesizing apparatus described in the aforementioned Patent Reference 2; synthesized images with differing angles and lighting conditions can be generated thereby.

SUMMARY OF THE INVENTION

However, there is a problem with the image synthesizing apparatus that generates a high-resolution image using the aforementioned conventional technology in that when lighting conditions such as the position, number, strength, and the like of the light sources differ between the low-resolution original image and the high-resolution reference image, the generated high-resolution synthesized image ends up having lighting conditions different from the original image.

Moreover, there is another problem with the image synthesizing apparatus that generates an image with arbitrary lighting conditions using the aforementioned conventional technology in that when images with differing resolutions are inputted, the correct linearization coefficient cannot be calculated due to the resolution of corresponding pixels being different; therefore, a synthesized image with the correct lighting conditions cannot be generated.

Accordingly, an object of the present invention, which has been conceived in light of the aforementioned problems with the conventional technology, is to provide an image synthesizing apparatus which generates, from plural images with differing resolutions and lighting conditions, a synthesized image in which the resolution of the original image is improved and the lighting conditions match those of the original image, and an image synthesizing method for achieving the same.

To solve the abovementioned problems, the image synthesizing apparatus according to the present invention generates, based on an original image, a synthesized image having a higher resolution than the original image, and includes: an image acquisition unit which acquires the original image and plural reference images, the reference images being obtained by capturing the same object shown in the original image under differing lighting conditions; an image conversion unit which converts at least one of the resolution of the original image and the resolution of the plural reference images so that the resolution of the original image acquired by the image acquisition unit and the resolution of the plural reference images are the same; a conversion coefficient calculation unit which calculates, based on the original image and plural reference images converted to the same resolution by the image conversion unit, a conversion coefficient used in generating the original image by performing linear combination on the plural reference images; and an image synthesizing unit which generates plural converted reference images by converting the resolution of the plural reference images to a target resolution, generates a linear-converted image by performing linear combination on the generated plural converted reference images using the conversion coefficient calculated by the conversion coefficient calculation unit, and outputs, as the synthesized image, the generated linear-converted image or an adjusted linear-converted image, the adjusted linear-converted image being the linear-converted image which has been adjusted.

Accordingly, it is possible to generate a high-resolution synthesized image with lighting conditions identical to those in the original image even in the case where the lighting conditions of the original image and plural reference images differ, by performing linear combination on the reference images using a conversion coefficient. Furthermore, it is possible to calculate the correct conversion coefficient, even when resolutions differ, by calculating the conversion coefficient using pixel values after processing that equalizes the resolution of the original image and the reference images has been performed; as a result, a more highly accurate synthesized image can be generated.

It should be noted that the present invention may be implemented not only as an image synthesizing apparatus, but also as an image synthesizing method, a program which causes a computer to execute the steps of that method, a computer-readable storage medium such as a CD-ROM in which that program has been stored, a semiconductor integrated circuit such as an LSI which implements the image synthesizing apparatus as a circuit, or the like.

According to the image synthesizing apparatus of the present invention, the conversion coefficient is calculated taking into account differences in resolution between the original image and the plural reference images, and therefore it is possible to generate a synthesized image in which the resolution of the original image is improved and the lighting conditions match those of the original image, even when the reference images have differing resolutions and lighting conditions.

FURTHER INFORMATION ABOUT TECHNICAL BACKGROUND TO THIS APPLICATION

The disclosure of Japanese Patent Application No. 2005-229908, filed on Aug. 8, 2005, including specification, drawings and claims is incorporated herein by reference in its entirety.

The disclosure of PCT Application No. PCT/JP2006/313608, filed on Jul. 7, 2006, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6 is a diagram showing an example of an original image and reference images;

FIG. 7 is a diagram showing an example of a synthesized image and converted reference images;

FIG. 11 is a diagram showing an example of a synthesized image;

FIG. 12 is a diagram showing an example of a different original image and reference images;

FIG. 14 is a diagram showing an example of a method for generating a converted reference image using subregions.

DESCRIPTION OF THE PREFERRED EMBODIMENT

Figure 1:
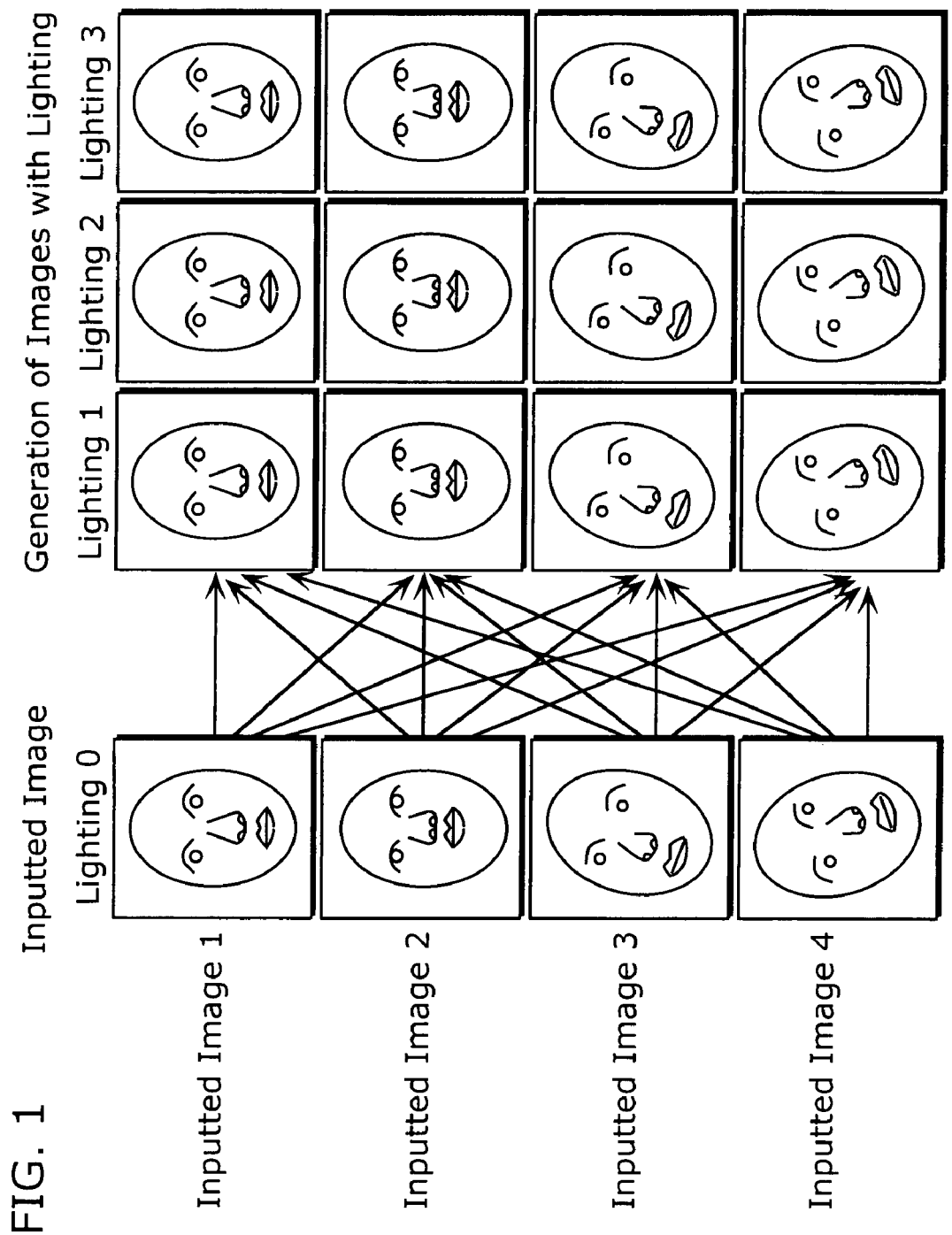
FIG. 1 is a diagram showing an example of images generated by a conventional image synthesizing apparatus.

The image synthesizing apparatus according to the present invention generates, based on an original image, a synthesized image having a higher resolution than the original image, and includes: an image acquisition unit which acquires the original image and plural reference images, the reference images being obtained by capturing the same object shown in the original image under differing lighting conditions; an image conversion unit which converts at least one of the resolution of the original image and the resolution of the plural reference images so that the resolution of the original image acquired by the image acquisition unit and the resolution of the plural reference images are the same; a conversion coefficient calculation unit which calculates, based on the original image and plural reference images converted to the same resolution by the image conversion unit, a conversion coefficient used in generating the original image by performing linear combination on the plural reference images; and an image synthesizing unit which generates plural converted reference images by converting the resolution of the plural reference images to a target resolution, generates a linear-converted image by performing linear combination on the generated plural converted reference images using the conversion coefficient calculated by the conversion coefficient calculation unit, and outputs, as the synthesized image, the generated linear-converted image or an adjusted linear-converted image, the adjusted linear-converted image being the linear-converted image which has been adjusted. Accordingly, it is possible to generate a high-resolution synthesized image with lighting conditions identical to those of the original image even in the case where the lighting conditions of the original image and plural reference images differ, by performing linear combination on the reference images using a conversion coefficient. Furthermore, it is possible to calculate the correct conversion coefficient, even when resolutions differ, by calculating the conversion coefficient using pixel values converted so that the resolutions of the original image and the reference images are equal; through this, a more highly accurate synthesized image can be generated.

Here, it is preferable for the image synthesizing unit to generate the synthesized image by generating a converted original image by performing processing that raises the resolution of the original image acquired by the image acquisition unit to a target resolution, and adjusting the linear-converted image using the generated converted original image. As a specific method of adjustment, there is a method in which the image synthesizing unit adjusts the linear-converted image by replacing pixels in the linear-converted image that fulfill a certain condition with corresponding pixels from the converted original image, and outputs the adjusted linear-converted image as the synthesized image. Regarding the certain condition referred to here, it is preferable for the image synthesizing unit to generate a converted linear-converted image by converting the resolution of the linear-converted image to the same resolution as the original image acquired by the image acquisition unit, and adjust the linear-converted image by replacing pixels in the linear-converted image with pixels from the converted original image in the case where the difference between pixel values of corresponding pixels in the generated converted linear-converted image and the original image is greater than or equal to a predetermined threshold. It can be assumed that, in an image that is the result of the synthesized image converted so as to have the same resolution as the original image, pixels which have different values than the values in the original image have been affected by noise in the reference images, do not follow linearization, or so on; accordingly, such pixels are replaced with pixels from the original image, and a natural synthesized image is generated thereby.

In addition, the image conversion unit may convert the resolutions of the original image and the plural reference images acquired by the image acquisition unit to the resolution of whichever image has the lowest resolution out of the original image and the plural reference images. For example, the image that has the lowest resolution out of the original image acquired by said image acquisition unit and the plural reference images may be the original image, and the image conversion unit may equalize the resolutions of the original image and the plural reference images by converting the resolution of the plural reference images acquired by the image acquisition unit to the resolution of the original image acquired by the image acquisition unit. Accordingly, the conversion coefficient is calculated after the original image and the plural reference images have been set to the lowest resolution, and thereby the inclusion of errors that accompany processing for raising the resolution can be avoided.

In addition, the image conversion unit may extract, from the plural reference images, subregions made up of uniform pixel values from among the subregions in the plural reference images, based on the original image and plural reference images acquired by the image acquisition unit, the subregions corresponding to pixels in the original image, and output the extracted subregions of the plural reference images and the corresponding pixels of the original image, and the conversion coefficient calculation unit may calculate the conversion coefficient based on the subregions in the plural reference images outputted from the image conversion unit and the pixels in the original image. Accordingly, by selecting subregions, which are regions in which pixel values, in the vicinity of pixels that correspond between the original image and the reference image of differing resolutions, are uniform, it is possible to obtain a converted reference image made up of pixel values of the same resolution without expressly converting the resolution; the burden of calculation processing can therefore be reduced, and the processing accelerated.

Hereafter, an embodiment of the present invention shall be described in detail with reference to the drawings.

Figure 2:
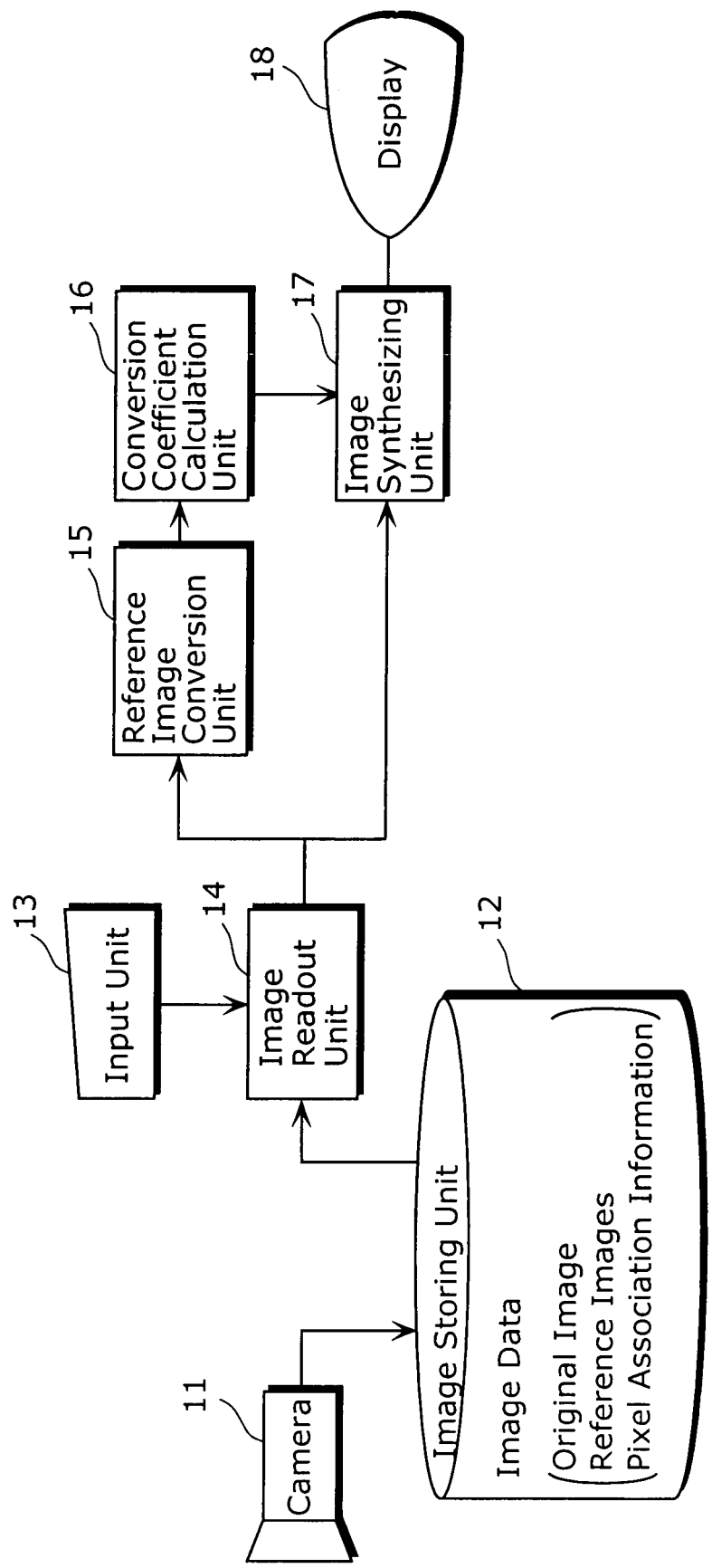
FIG. 2 is a diagram showing the configuration of an image synthesizing apparatus according to an embodiment of the present invention.

FIG. 2 is a diagram showing the configuration of an image synthesizing apparatus embodying the present invention. This image synthesizing apparatus is an apparatus which improves resolution without changing the lighting conditions of the original image by using reference images, and includes a camera 11, an image storing unit 12, an input unit 13, an image readout unit 14, a reference image conversion unit 15, a coefficient calculation unit 16, an image synthesizing unit 17, and a display 18. It should be noted that "resolution" refers to the spatial resolution in image data; in the case where the distance between the object and the camera is fixed, the resolution increases as the focal length grows (more pixels appear for the same object).

The camera 11 is an imaging device which captures images of an object and outputs such images.

Figure 3:
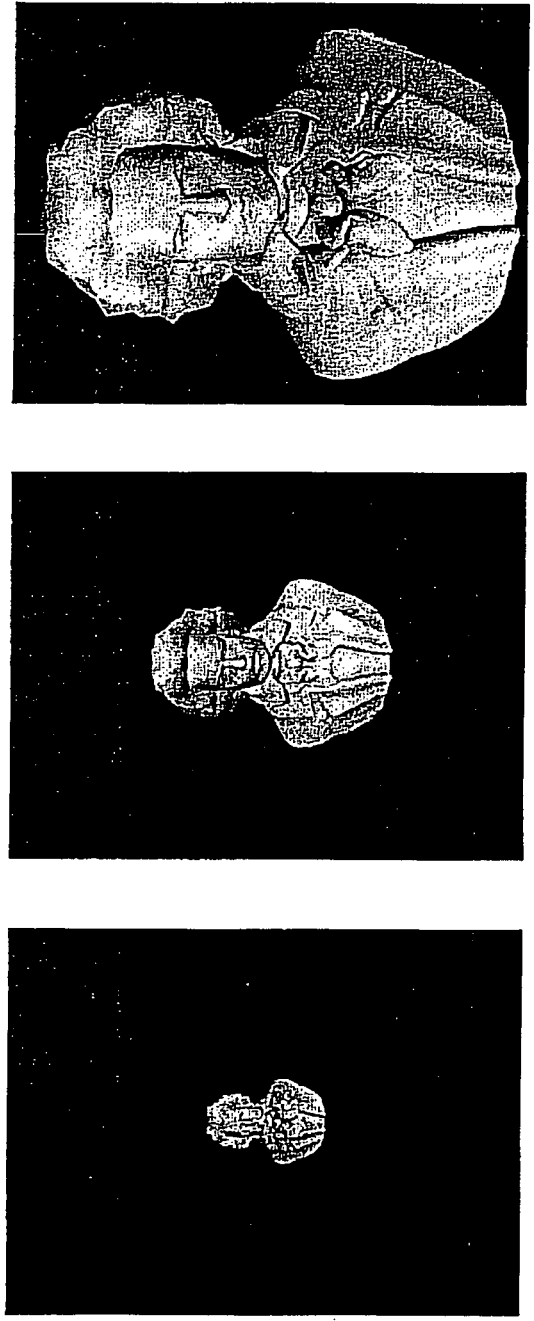
FIG. 3 is a diagram showing an example of image data stored in an image storage unit.

The image storing unit 12 is a hard disk or the like which stores images captured by the camera 11 along with pixel association information, which is composed of information such as the focal length, camera angle, and so on of the camera at the time when the image is captured. FIGS. 3 (a) and (b) respectively show examples of images stored in the image storing unit 12 and the pixel association information thereof. Note that in the present embodiment, the "images" stored in the image storing unit 12 include original images and reference images. "Original image" refers to an image on which image synthesis (in this case, processing to improve the resolution without changing the lighting conditions) is to be performed by the image synthesizing apparatus. "Reference image" refers to an image that provides a standard used in the image synthesis; for example, the reference image is an image of the same object as that shown in the original image, but which has been captured under different lighting conditions.

The input unit 13 is a processing unit that includes an interface for acquiring instructions from a user concerning selection of the original image and plural reference images, a resolution ratio indicating to what degree the resolution of the original image is to be increased, and so on, and provides those instructions to the image readout unit 14.

The image readout unit 14 is a processing unit which reads out the original image, plural reference images, and pixel association information from the image storing unit 12 in accordance with the instructions from the input unit 13, and outputs the original image, reference images, and pixel association information to the reference image conversion unit 15 and the image synthesizing unit 17.

The reference image conversion unit 15 is a processing unit which equalizes the resolutions of the original image and the plural reference images based on the original image, plural reference images, and pixel association information read out by the image readout unit 14. In the present embodiment, out of the original image and the plural reference images, the original image is the image with the lowest resolution; therefore, the reference image conversion unit 15 converts the plural reference images so as to have the same resolution as the original image. A reference image converted in such a manner is referred to as a "converted reference image."

The coefficient calculation unit 16 is a processing unit which calculates a conversion coefficient used in performing linear combination on the plural converted reference images and generating the original image, based on the plural converted reference images obtained from the reference image conversion unit 15 and the original image provided by the reference image conversion unit 15. Here, a linear coefficient for expressing the original image through a linear combination of the plural converted reference images is calculated using pixels values in the same spatial positions.

The image synthesizing unit 17 is a processing unit which generates an image with improved resolution in which the lighting conditions have not been changed from those of the original image (such an image shall hereafter be called a "synthesized image") based on the original image and plural reference images read out by the image readout unit 14, the resolution ratio notified by the image readout unit 14, the conversion coefficient calculated by the coefficient calculation unit 16, and so on, and outputs the synthesized image to the display 18.

To be more specific, the image synthesizing unit 17 generates plural converted reference images by converting the plural reference images read out by the image readout unit 14 to the target resolution, generates a linear-converted image by performing linear combination on the generated plural converted reference images using the conversion coefficient calculated by the coefficient calculation unit 16, and outputs the generated linear-converted image or an adjusted version of the linear-converted image as the synthesized image.

When adjusting the linear-converted image and generating a synthesized image, the image synthesizing unit 17 generates a converted original image by performing processing for raising the resolution of the original image read out by the image readout unit 14 to the target resolution, and adjusts the linear-converted image using the converted original image that has been generated. Specifically, the image synthesizing unit 17 replaces pixels that make up the linear-converted image and which fulfill a certain condition with their corresponding pixels in the converted original image; the adjusted linear-converted image is outputted as the synthesized image. To go into further detail, the image synthesizing unit 17 generates the converted linear-converted image by converting the linear-converted image into an image with the same resolution as the original image read out by the image readout unit 14, and adjusts the linear-converted image by replacing the pixels of the linear-converted image with pixels of the converted original image in the case where the absolute value of the difference between values of pixels corresponding between the generated converted linear-converted image and the original image is greater than or equal to a predetermined threshold value.

The display 18 is a liquid-crystal display device or the like which displays the synthesized image outputted from the image synthesizing unit 17.

Next, operations performed by the image synthesizing apparatus of the present embodiment, which is configured in the manner described above, shall be explained. Here the example given describes the following: first, the camera 11 captures an image, and plural pieces of image data are stored in the image storing unit 12; after that, a synthesized image is generated using an original image and three reference images selected by the user from among the image data stored in the image storing unit 12.

The camera 11 is a Pan/Tilt/Zoom (PTZ) camera, the viewpoint position of which is fixed, and the capturing direction (pan/tilt angle) and the capturing range (zoom ratio) of which are variable; the object captured by the camera is assumed to be static. The camera 11 captures the object in accordance with pre-determined pan/tilt angle, zoom ratio, and timing. At this time, information of a rotation matrix R, which expresses the pan/tilt angle, and a focal length f, which corresponds to the zoom ratio, is also stored in the image storing unit 12 as the pixel association information, along with the image data.

It should be noted that the relationship between pixel coordinates (xi, yi) and (xj, yj) found in an arbitrary two images Ii and Ij can be reciprocally converted through formula 1 using the respective capturing directions Ri and Rj and the focal lengths fi and fj.

$$\begin{pmatrix} px \times xj \\ py \times yj \\ fj \end{pmatrix} = aR_j R_i^{-1} \begin{pmatrix} px \times xi \\ py \times yi \\ fi \end{pmatrix}$$ [Formula 1]

$$R_i = \begin{pmatrix} ri_{11} & ri_{12} & ri_{13} \\ ri_{21} & ri_{22} & ri_{23} \\ ri_{31} & ri_{32} & ri_{33} \end{pmatrix}, R_j = \begin{pmatrix} rj_{11} & rj_{12} & rj_{13} \\ rj_{21} & rj_{22} & rj_{23} \\ rj_{31} & rj_{32} & rj_{33} \end{pmatrix}$$

In formula 1, px and py are the respective sizes of the x and y directions of one pixel on a plane of projection, and are found in advance through calibration. In addition, a is a coefficient for converting the scale, the value of which is calculated so that the values in the third line on the right and left sides match. Accordingly, in the present embodiment, the information of the capturing directions R and focal lengths f as shown in formula 1, which is the information which establishes the relationship between pixel coordinates (xi, yi) and (xj, yj) found in an arbitrary two images Ii and Ij, is called "pixel association information."

FIG. 3 shows examples of image data captured by the camera 11 and stored in the image storing unit 12, and the pixel association information, as have been described above. In the present embodiment, the number of pixels in each piece of image data stored in the image storing unit 12 are identical; that is, there are 768 pixels on the horizontal (x coordinates) and 1024 pixels on the vertical (y coordinates). In addition, the representations of the image data in the diagram assume a constant size for each pixel, so that the size of the figure shown in the diagram corresponds to the amount of pixels in the image data (the same applies to diagrams hereafter unless otherwise specified). FIG. 3 (a) shows images in which the same object is captured at a constant pan/tilt angle but at different zoom ratios; the length of pixel coordinates against the unit length found in real space on the surface of the object, or in other words, the resolution, differs between the images. In addition, shadows cast on the object differ between the images, due to differences in lighting conditions such as the position, number, and strength of lighting present when the image is captured. FIG. 3 (b) is an example of the pixel association information when each image is captured, or in other words, is an example of capturing directions R and focal lengths f. Note that in this diagram, the focal length f is a value in the case where the pixel size px and py in formula 1 are both 0.019497 mm.

In this manner, plural images with differing lighting conditions and resolution, and pixel association information composed of the capturing directions and focal lengths of each of those images, which are illustrated in FIG. 3, are stored in the image storing unit 12.

Hereafter, operations performed when generating a synthesized image using an original image and plural reference images selected by the user via the input unit 13 from among the image data stored in the image storing unit 12, and a resolution ratio ko between the original image and the synthesized image, shall be described.

Figure 4:
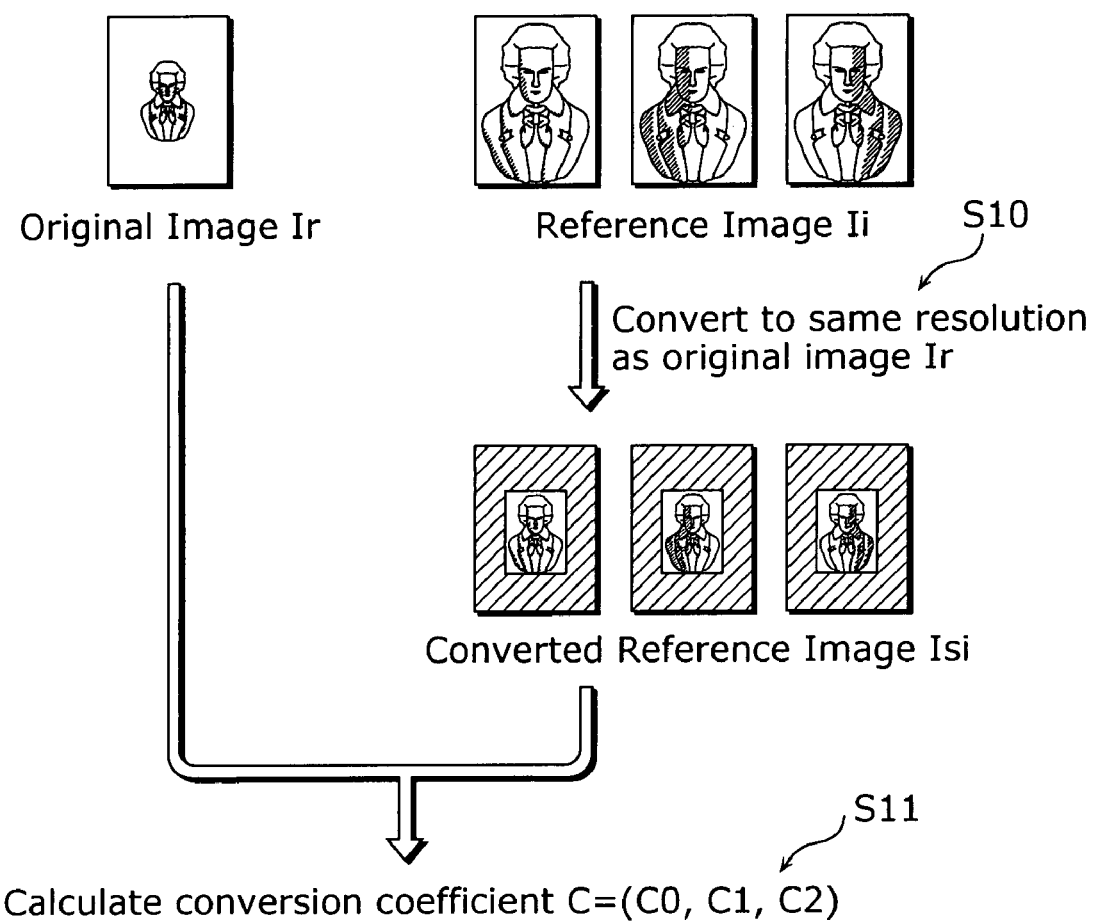
FIG. 4 is a data-flow diagram showing a procedure for calculating a conversion coefficient, which is the former half of processing for generating a synthesized image.
Figure 5:
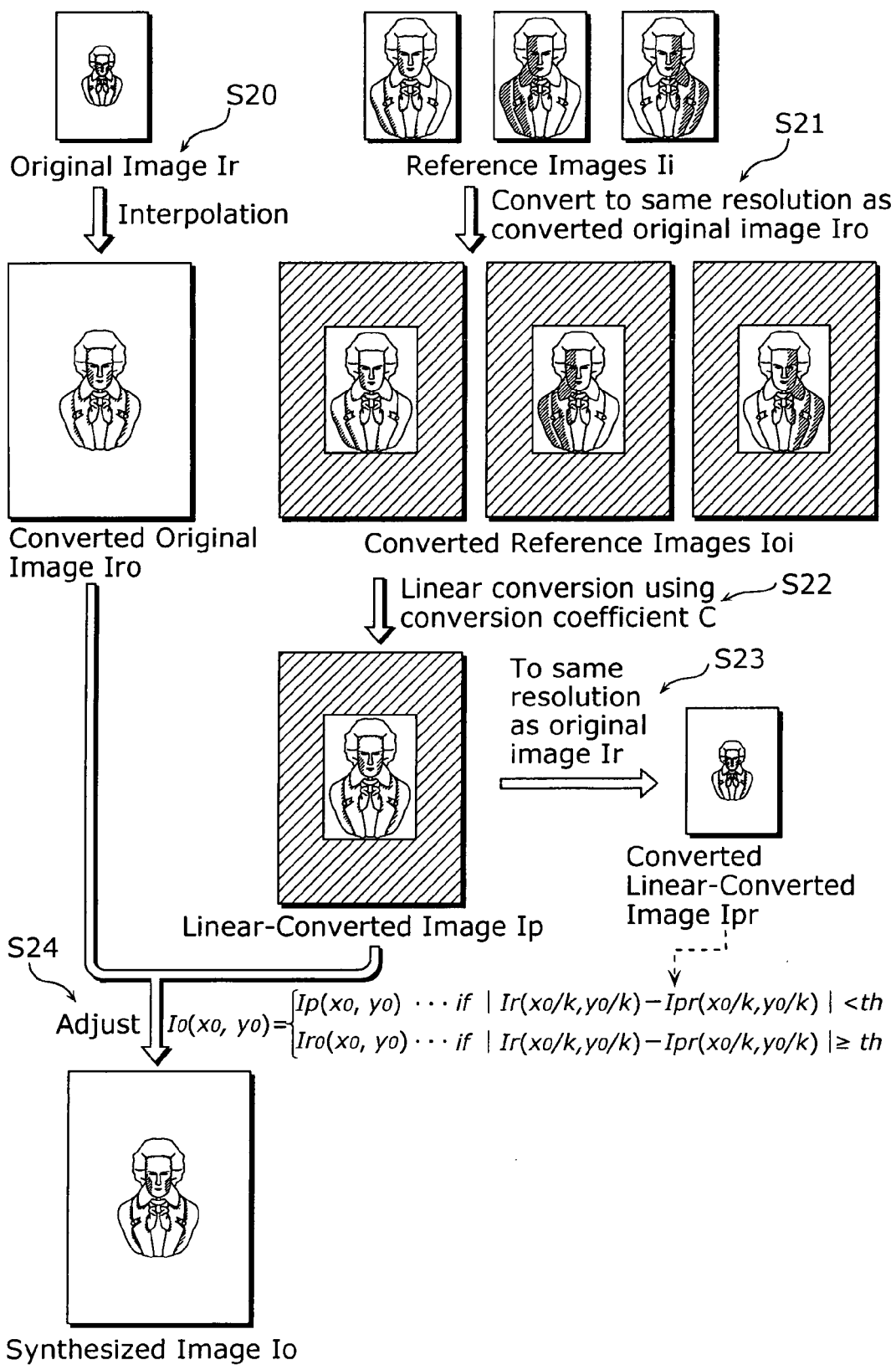
FIG. 5 is a data-flow diagram showing a procedure for synthesizing an image, which is the latter half of processing for generating a synthesized image.

FIG. 4 is a data-flow diagram showing a procedure for calculating a conversion coefficient (a procedure mainly performed by the reference image conversion unit 15 and the coefficient calculation unit 16), which is the former half of the process of generating a synthesized image, whereas FIG. 5 is a data-flow diagram showing a procedure for synthesizing an image (a procedure mainly performed by the image synthesizing unit 17), which is the latter half of the process of generating a synthesized image. Here, descriptions shall be given regarding operations performed when generating a synthesized image Io, as shown in FIG. 7 (a). This synthesized image Io has a resolution twice as high (ko=2) as that of an original image Ir (768 pixels×1024 pixels) shown in FIG. 6 (a), or in other words, has four times the number of pixels (1536 pixels×2048 pixels) within an identical captured range; however, the synthesized image Io has the same lighting conditions as the original image Ir.

FIGS. 6 (a) and (b) are diagrams showing examples of an original image Ir and three reference images Ii, which have been selected by the user via the input unit 13 and read out from the image storing unit 12 by the image readout unit 14, and the pixel association information of these images. The lighting position and focal lengths differ between the original image Ir and the reference images Ii. In the example shown in FIG. 6, the focal length f is 12.05 mm in the original image Ir, as opposed to 24.1 mm in the reference images Ii; hence the reference images Ii are images in which part of the original image Ir has been enlarged. Furthermore, the lighting position in the original image Ir is frontal to the statue in the image, which is the object (in other words, the lighting is coming from the direction of the camera), whereas in the three reference images Ii, lighting comes from three different directions relative to the lighting position in the original image, or 10 degrees left/20 degrees above, 20 degrees left/20 degrees below, and 20 degrees right/10 degrees below, respectively. Note that when the user selects a reference image Ii, it is preferable for the reference image Ii to have a higher resolution (greater focal length) than the original image Ir, and for each reference image Ii to have a lighting position different from that of the other reference images Ii.

The reference image conversion unit 15 first calculates a ratio between the resolution of the original image Ir and the resolution of the reference images Ii (i=0 . . . 2), based on the original image Ir and reference images Ii read out by the image readout unit 14 and the pixel association information that corresponds to the read-out images. Here, the resolution ratio ki is assumed as using a focal length ratio fi/fr. In the example shown in FIG. 6, each of the reference images Ii has a resolution twice as high (in other words, ki=2) than the original image Ir. Note that the resolution ratio may be calculated from the size ratio of one pixel, or an average value thereof, using formula 1 based on the corresponding information R and f found in each image, instead of using the focal length ratio.

Next, the reference image conversion unit 15 removes high-range components of the reference images Ii through low-pass filtering performed in accordance with an inverse of the resolution ratio, or 1/ki, of each reference image (step S10 in FIG. 4). In other words, as the reference images Ii have twice the resolution of the original image Ir, the high-range components are eliminated via a low-pass filter that has a cutoff frequency of one-half of the frequency range of the reference images Ii (a cutoff frequency of one-fourth the sampling frequency of the reference images Ii). Lastly, pixel values of the filtered reference images Ii, the pixel coordinates of which are found through formula 1, are used as pixel values corresponding to the pixel coordinates in the original image Ir, and are outputted as converted reference images Isi.

FIG. 7(b) shows examples of the converted reference images Isi generated through the above procedure (step 10 in FIG. 4); these images are equivalent to images generated by putting the three reference images Ii through a ½ low-pass filter and re-sampling the images, and have ½ the resolution of the synthesized image. It should be noted that the hatched areas in FIG. 7(b) indicate regions that have no corresponding pixels in the reference images Ii, and that the converted reference images Isi in FIG. 7(b) have pixels values only in the regions in which the statue found in the original image Ir is present in FIG. 6(a) (in other words, the region within the white dotted line in FIG. 6(a)).

Continuing on, the coefficient calculation unit 16 calculates the conversion coefficient C using the converted reference images Isi generated by the reference image conversion unit 15 (step S11 of FIG. 4). In regards to the conversion coefficient C=(c0, c1, c2), assuming the pixel values of the pixel coordinates (x, y) in the original image Ir are Ir(x, y), the corresponding pixel values in the converted reference image Isi are Isi(x, y), and i=0 . . . 2, then formula 2, shown below, holds true.

$$Ir(x,y)=c_0 \times Is_0(x,y)+c_1 \times Is_1(x,y)+c_2 \times Is_2(x,y)$$ [Formula 2]

Therefore, upon being provided with the pixel values of pixel coordinates corresponding between three or more original images Ir and converted reference images Isi, the coefficient calculation unit 16 can calculate the conversion coefficient C. The conversion coefficient C calculated from the example given in FIG. 7(b) is (c0, c1, c2)=(0.44, 0.22, 0.43).

Note that the above formula 2 is a formula that holds true for pixels not in shadow when the frontal plane of the object shown in the original image Ir and the reference images Ii is a perfectly diffused reflective surface and the light source is parallel light, and is a theory proposed by Shashua et al. Details can be found in "Shashua, A., *Geometry and Photometry in 3D Visual Recognition*, Ph.D thesis, Dept. Brain and Cognitive Science, NIT, 1992," and thus detailed explanations shall not be given here. In addition, while there are instances where formula 2 holds approximately true even when specular reflection and shadows are present in the original image Ir and reference images Ii, the surface is not a perfectly diffused reflective surface, the light source is not perfectly parallel, and so on, it is not possible to find the conversion coefficient C in formula 2 through the above-mentioned method. However, a different method for finding the conversion coefficient C when specular reflection and shadows are present can be found in "Mukaigawa, Y., H. Miyaki, S. Mihashi, and T. Shakunaga, 'Photometric Image-Based Rendering for Image Generation in Arbitrary Illumination', Information Processing Society Publication: *Computer Vision and Image Media*, vol. 41, No. SIG10 (CVIM1), pp. 19-30, 2000"; therefore, detailed explanations shall be omitted here.

Figure 8:
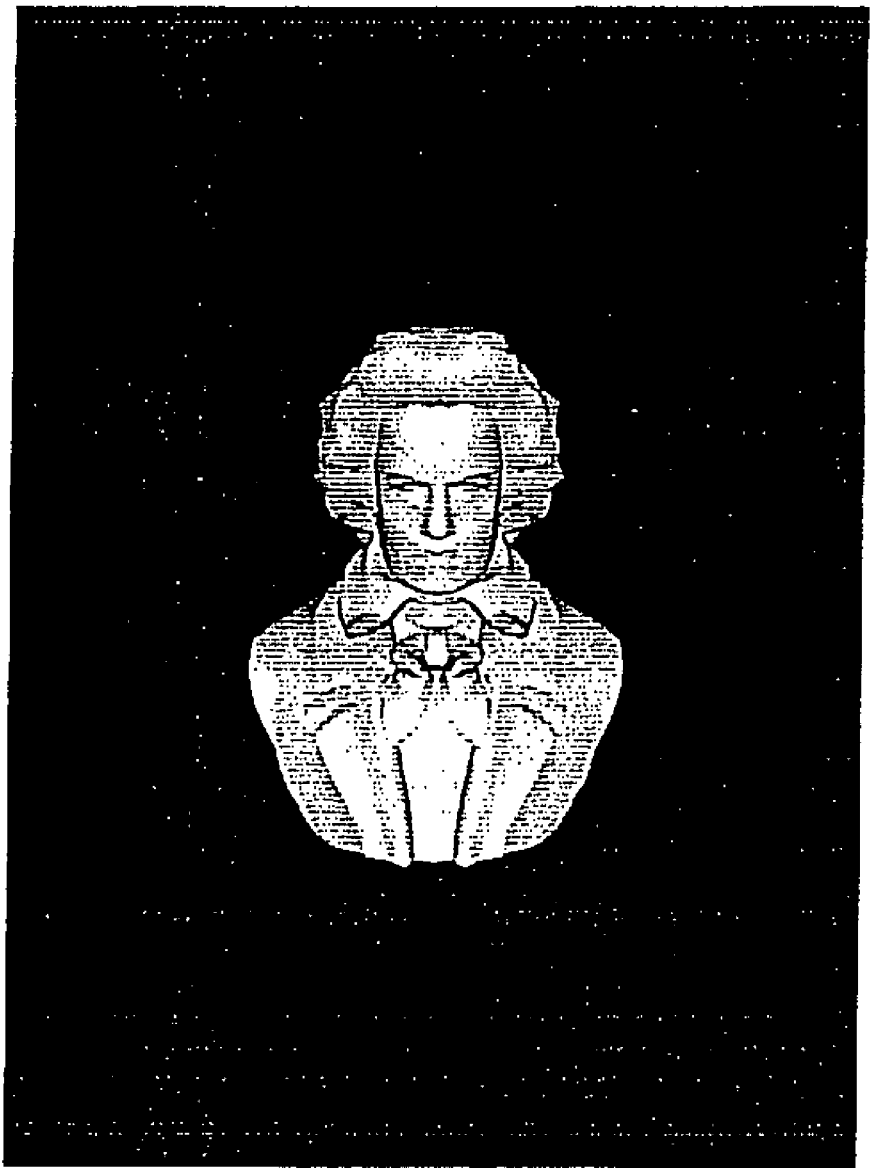
FIG. 8 is a diagram showing an example of a converted original image.
Figure 9:
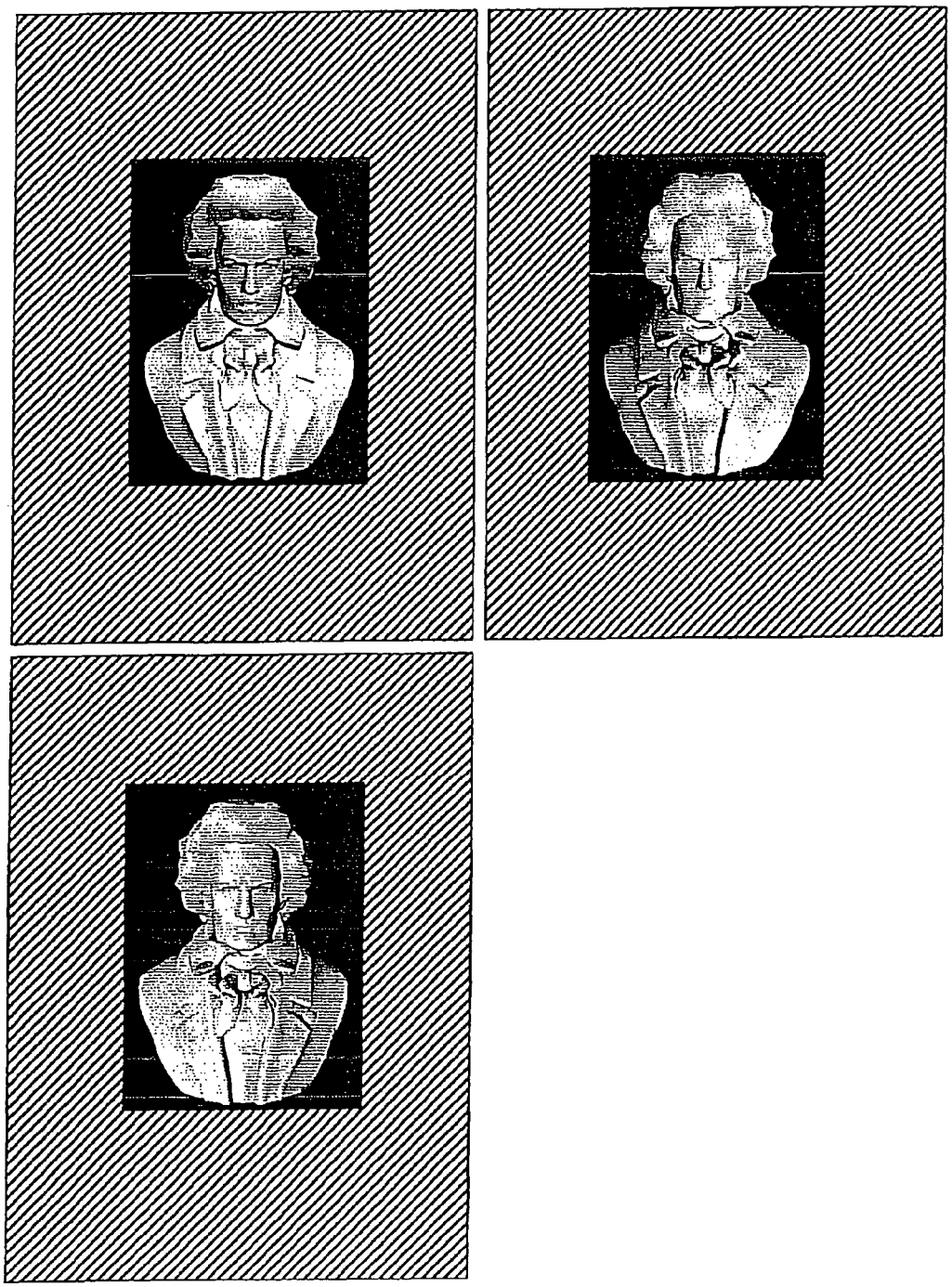
FIG. 9 is a diagram showing an example of converted reference images.

Continuing on, to generate the synthesized image, the image synthesizing unit 17 first generates a converted original image Iro, in which the original image Ir has been enlarged, from the original image Ir and the resolution ratio ko between the original image Ir and the synthesized image Io (step S20 in FIG. 5). The image synthesizing unit 17 uses a generally-known method, such as bilinear interpolation or bicubic interpolation, to generate the converted original image Iro from the original image Ir. Furthermore, the image synthesizing unit 17 generates converted reference images Ioi, in which the plural reference images Ii have been converted so as to have the same resolution as the converted original image Iro (step S21 in FIG. 5). FIGS. 8 and 9 show examples of the converted original image Iro and the converted reference images Ioi respectively.

Figure 10:
FIG. 10 is a diagram showing an example of a linear-converted image.

Next, the image synthesizing unit 17 uses the conversion coefficient C and the pixel values Ioi(xo, yo) of the converted reference image Ioi and, through formula 3 (shown below), generates pixel values Ip(xo, yo) of the pixel coordinates (xo, yo) of a linear-converted image Ip (step S22 of FIG. 5). FIG. 10 shows an example of the linear-converted image Ip generated using the converted reference image Ioi shown in FIG. 9 and the conversion coefficient C.

$$Ip(xo,yo)=c_0 \times Io_0(xo,yo)+c_1 \times Io_1(xo,yo)+c_2 \times Io_2(xo,yo)$$ [Formula 3]

Lastly, the image synthesizing unit 17 generates the synthesized image Io by adjusting the linear-converted image Ip using the converted original image Iro (steps S23 and S24 in FIG. 5). To perform this, the image synthesizing unit 17 first generates a converted linear-converted image Ipr, in which the resolution of the linear-converted image Ip has been converted so as to have the same resolution as the original image Ir. Then, the image synthesizing unit 17 substitutes, for pixel values Io(xo, yo) of pixel coordinates (xo, yo) of the synthesized image Io, pixel values Ip(xo, yo) of the linear-converted image, in the case where the absolute value of the difference between pixel values Ir(xo/k, yo/k) of the original image Ir and pixel values Ipr(xo/k, yo/k) of the converted linear-converted image Ipr is below a predetermined threshold th, and when such is not the case, substitutes pixel values Iro(xo, yo) of the converted original image Iro, thereby generating the synthesized image Io (step S24 in FIG. 5; formula 4). To put it differently, the image synthesizing unit 17 adjusts the linear-converted image Ip by replacing pixels of the linear-converted image Ip with pixels of the converted original image Iro in the case where the absolute value of the difference between the corresponding pixels in the converted linear-converted image Ipr and the original image Ir is greater than or equal to a predetermined threshold, and uses the adjusted linear-converted image Ip as the synthesized image Io.

As described thus far, according to the present embodiment, the correct conversion coefficient can be calculated even in the case where the resolutions of the original image Ir and the plural reference images Ii differ by using the converted reference images Isi, which are generated by the reference image conversion unit and which have the same resolution; accordingly, the present invention has an advantageous effect in that it is possible to obtain a synthesized image Io, in which the resolution of the original image $$Io(xo, yo) = \begin{cases} Ip(xo, yo) & \ldots \text{ if } |Ir(xo/k, yo/k) - Ipr(xo/k, yo/k)| < th \\ Iro(xo, yo) & \ldots \text{ if } |Ir(xo/k, yo/k) - Ipr(xo/k, yo/k)| \geq th \end{cases}$$ [Formula 4]

An example of the synthesized image Io generated through the above procedure is shown in FIG. 11. It can be seen that the synthesized image Io in FIG. 11 (a) is an image with a higher resolution than a bilinearly-enlarged original image Ir, which is shown in FIG. 11 (b), and furthermore has the same lighting conditions as the original image Ir.

It should be noted that in the above example, the resolution of the plural reference images Ii is the same, and the resolution of the synthesized image Io is the same as the resolution of the reference images Ii. Under such resolution conditions, a high-resolution synthesized image Io can be generated without error through formula 3, as long as the surface of the object is a perfectly diffusing surface and the light source is parallel. However, there is no assurance that formula 3 will theoretically hold true in the case where the resolution of the reference images Ii is lower than the resolution of the synthesized image Io. Nevertheless, the inventor has confirmed, through experimentation, that there are instances where better results are obtained through the technique of the present invention than when simply performing bilinear interpolation, even when the resolution of some of the reference images Ii is lower than the resolution of the synthesized image Io.

Figure 13:
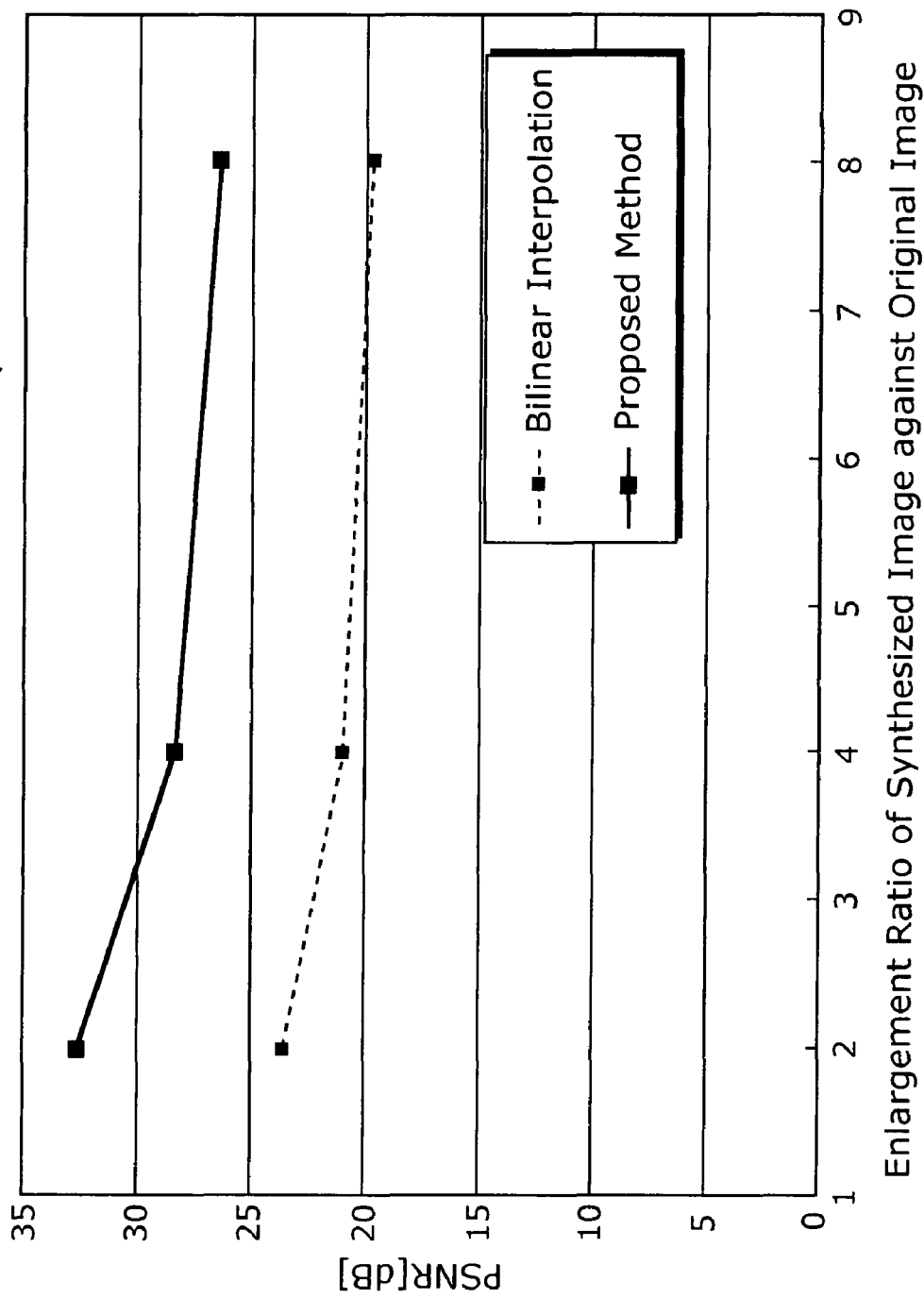
FIG. 13 is a diagram showing an example of the relationship between the enlargement ratio and a PSNR, which indicates an effect of the present invention.

FIG. 12 is a diagram showing an example of an original image Ir and reference images Ii, the resolutions of which differ in such a manner. FIG. 13 is a graph comparing the image quality of the synthesized image Io obtained by enlarging the original image Ir shown in FIG. 12 by 2, 4, and 8 times via the image synthesizing apparatus according to the present embodiment, with the image quality of an image generated by performing bilinear interpolation on the original image Ir. The vertical axis is an assessment value, and indicates a Peak-Signal to Noise Ratio (PSNR) showing the degree of error in each image against the true image; the horizontal axis is the enlargement ratio of the resolution. In the graph shown in FIG. 13, it can be seen that the PSNR of the synthesized image Io generated through the method according to the present invention (the "proposed method" in the diagram) is higher than the PSNR of the image generated through bilinear interpolation, which means that the synthesized image Io generated through the method according to the present invention is of higher quality. Based on this, formula 3 theoretically holds true in the case where the resolution of all reference images Ii are the same or higher than the resolution of the synthesized image Io, and contains errors in other cases; nevertheless, it can be said that the present invention is superior to other general synthesis methods even taking into account those errors.

Ir has been increased, from reference images Ii that have differing lighting conditions and resolutions.

It should be noted that while in the present embodiment, the image data stored in the image storing unit 12 is assumed to be images captured with only the capturing range (zoom) of the camera 11 being altered, the images may differ both in capturing direction (pan/tilt) and capturing range (zoom).

In addition, in the present embodiment, the reference image conversion unit 15 uses, as pixel values for pixels corresponding between the original image Ir and the reference images Ii, pixel values filtered via a low-pass filter based on the resolution ratio between the images; however, rather than using a low-pass filter, pixel values in regions in which neighboring pixel values are identical, or regions in which fluctuation among pixel values is below a predetermined threshold, may be used instead.

FIG. 14 is a diagram showing an example of such a situation. Note that the reference images Ii and the original image Ir are the same as those shown in FIG. 6, and the reference images Ii have a resolution twice that of the original image Ir (ki=2). At this time, there are, as indicated by the quadrangles in FIG. 14, subregions of neighboring pixels ki×ki (2×2) of pixel coordinates in each reference image Ii, the pixel coordinates corresponding to the pixel coordinates in the original image Ir; the reference image conversion unit 15 extracts groups, in which pixel values are the same, within each subregion. In each of the three quadrangular subregions (2×2 pixels) within the reference images Ii shown in FIG. 14(b), the pixel values within the subregion are identical, and furthermore correspond to three pixels within the original image Ir, which are indicated by the three small quadrangles shown in FIG. 14(a). The reference image conversion unit 15 outputs the groups of pixel values of the original image Ir and each reference image Ii found at this time as the converted reference image Isi.

By using the converted reference image Isi obtained in such a manner, the coefficient calculation unit 16 can obtain the correct conversion coefficient used in formula 2 in the same manner as when using pixel values that have been filtered by a low-pass filter, even in the case where the resolutions of the reference images Ii differ from the resolution of the original image Ir.

In addition, in the present embodiment, the original image Ir and three reference images Ii are selected by the user via the input unit 13, read out from the image storing unit 12 by the image readout unit 14, and inputted into the reference image conversion unit 15; however, a setup in which the original image Ir is selected by the user whereas the reference image conversion unit 15 reads out the three reference images Ii directly from the image storing unit 12 may be employed. To be more specific, the reference image conversion unit 15 uses the pixel association information, or in other words, the capturing direction and focal length in the original image Ir, reads out, from the image storing unit 12, a number of images captured with the capturing range (field of view) of the original image Ir and which have a resolution higher than that of the original image Ir, and uses those read-out images as the reference images Ii.

Furthermore, the present embodiment describes three reference images Ii, but there may be more than three reference images Ii. Using more than three images has an effect in that a synthesized image with the same lighting conditions as the original image can be approximately generated through linear combination of the more than three reference images, even in the case where the conditions described in the Shashua theory, or in other words, that the surface of the object in the original image and reference images is a perfectly diffused surface and the light source is parallel, are not fulfilled. Moreover, even in the case where the original image and the reference images fulfill the conditions of the Shashua theory, when, for example, the light source vector at the time of capturing the original image and two reference images follows the same straight line, a synthesized image with the same lighting conditions as in the original image can be generated through linear combination using those two reference images.

Figure 15:
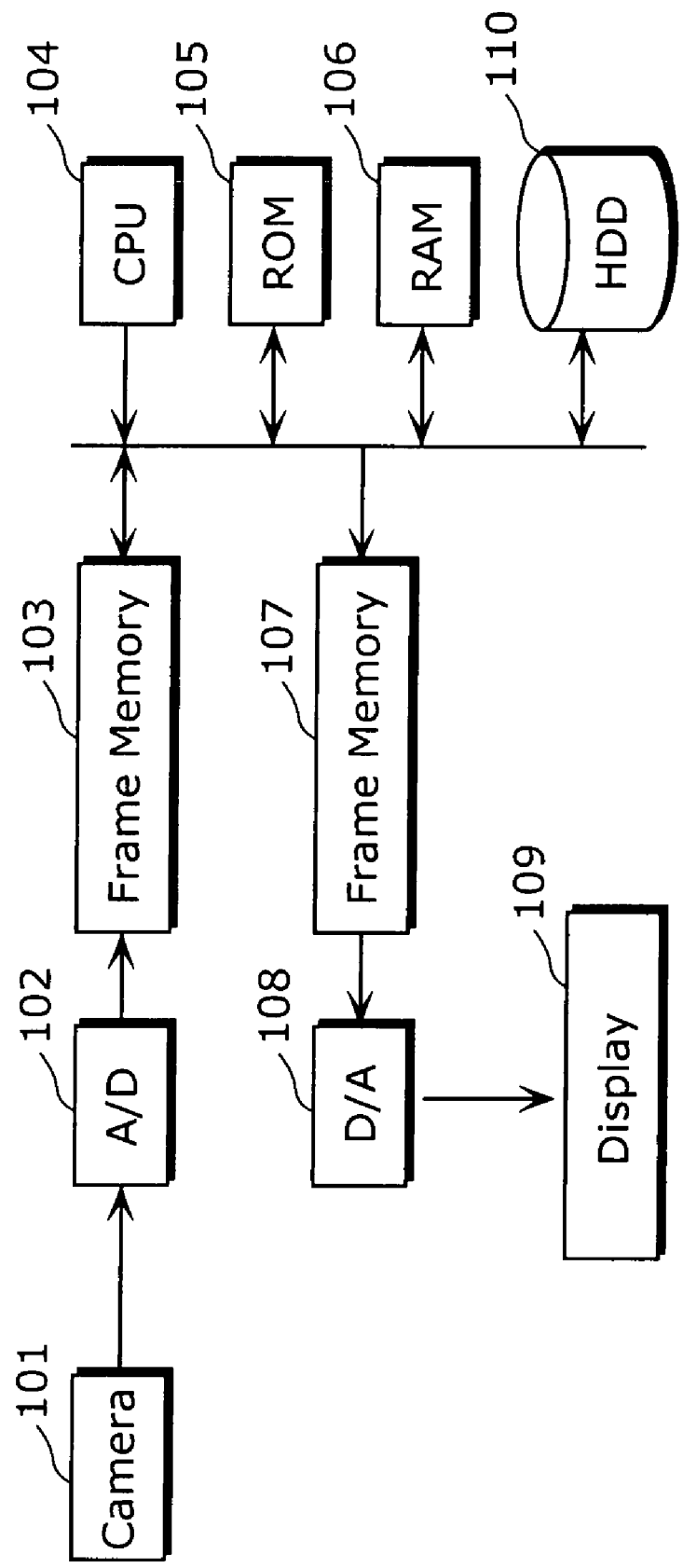
FIG. 15 is a diagram showing a configuration where the image synthesizing apparatus is configured of a computer.

Furthermore, while the present embodiment has described an apparatus in which the individual processing units are realized via individual hardware units, such as circuits, the present invention may be realized as a single integrated circuit in which all of the processing units are included; the processing units may also be implemented as software executed by a computer (for example, a CPU 104, a ROM 105, a RAM 106, and so on) in a computer device that includes a camera 101, A/D converter 102, frame memories 103 and 107, the CPU 104, the ROM 105, the RAM 106, a D/A converter 108, a display 109, and an HDD 110, as shown in FIG. 15. The same effects as described in the present embodiment can be obtained in such cases as well.

In other words, as shown in FIG. 15, the image synthesizing apparatus according to the present invention may be realized as an image synthesizing apparatus which generates, based on an original image, a synthesized image having a higher resolution than the original image, and includes: a camera 101 which acquires the original image and plural reference images, the reference images being obtained by capturing the same object shown in the original image under differing lighting conditions; a storage device (HDD 110) which stores the original image and the plural reference images captured by the camera 101; a processor (CPU 104) which, by executing a program stored in the HDD 110, ROM 105, or the like, (1) acquires the original image and plural reference images by reading out the original image and reference images from the storage device, (2) converts at least one of the resolution of the original image and the resolution of the plural reference images so that the resolution of the acquired original image and the resolution of the plural reference images are the same, (3) calculates, based on the original image and plural reference images converted to the same resolution, a conversion coefficient used in generating the original image by performing linear combination on the plural reference images, and (4) generating the synthesized image by: generating plural converted reference images by converting the resolution of the plural reference images to a target resolution; generating a linear-converted image by performing linear combination on the generated plural converted reference images using the conversion coefficient; and outputting, as the synthesized image, the generated linear-converted image or an adjusted linear-converted image, the adjusted linear-converted image being the linear-converted image which has been adjusted; and a display device (display 109) which displays the synthesized image generated by the processor.

In addition, the relationship between the constituent elements described in the above embodiment and the constituent elements found in the claims denoted hereafter is as follows: the camera 11 described in the embodiment is an example of the image acquisition unit found in the claims; the reference image conversion unit 15 is an example of the image conversion unit found in the claims; the coefficient calculation unit 16 is an example of the conversion coefficient calculation unit found in the claims; and the image synthesizing unit 17 is an example of the image synthesizing unit found in the claims.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention can be utilized as an image synthesizing apparatus which improves the resolution of an original image, and is particularly useful as an image synthesizing apparatus, image editing apparatus, or the like which edits/processes and outputs, for example, images captured by digital cameras, movie cameras, surveillance cameras, and so on, or images of recorded television broadcasts, and so on. Furthermore, such functionality may be built directly into a camera, television, display, or the like.

What is claimed is:

1. An image synthesizing apparatus which generates, based on an original image, a synthesized image having a higher resolution than the original image, said apparatus comprising:

an image acquisition unit operable to acquire the original image and plural reference images, the reference images being obtained by capturing the same object shown in the original image under differing lighting conditions;

an image conversion unit operable to convert at least one of the resolution of the original image and the resolution of the plural reference images so that the resolution of the original image acquired by said image acquisition unit and the resolution of the plural reference images are the same;

a conversion coefficient calculation unit operable to calculate, based on the original image and plural reference images converted to the same resolution by said image conversion unit, a conversion coefficient used in generating the original image by performing linear combination on the plural reference images; and an image synthesizing unit operable to generate plural converted reference images by converting the resolution of the plural reference images to a target resolution; generate a linear-converted image by performing linear combination on the generated plural converted reference images using the conversion coefficient calculated by said conversion coefficient calculation unit; and output, as the synthesized image, the generated linear-converted image or an adjusted linear-converted image, the adjusted linear-converted image being the linear-converted image which has been adjusted.

2. The image synthesizing apparatus according to claim 1, wherein said image synthesizing unit is further operable to generate the synthesized image by generating a converted original image by performing processing that raises the resolution of the original image acquired by said image acquisition unit to a target resolution, and adjusting the linear-converted image using the generated converted original image.

3. The image synthesizing apparatus according to claim 2, wherein said image synthesizing unit is operable to adjust the linear-converted image by replacing pixels in the linear-converted image that fulfill a certain condition with corresponding pixels from the converted original image, and output the adjusted linear-converted image as the synthesized image.

4. The image synthesizing apparatus according to claim 3, wherein said image synthesizing unit is operable to generate a converted linear-converted image by converting the resolution of the linear-converted image to the same resolution as the original image acquired by said image acquisition unit, and adjust the linear-converted image by replacing pixels in the linear-converted image with pixels from the converted original image in the case where the difference between pixel values of corresponding pixels in the generated converted linear-converted image and the original image is greater than or equal to a predetermined threshold.

5. The image synthesizing apparatus according to claim 1, wherein said image conversion unit is operable to convert the resolutions of the original image and the plural reference images acquired by said image acquisition unit to the resolution of whichever image has the lowest resolution out of the original image and the plural reference images.

6. The image synthesizing apparatus according to claim 5, wherein the image that has the lowest resolution out of the original image acquired by said image acquisition unit and the plural reference images is the original image, and
said image conversion unit is operable to equalize the resolutions of the original image and the plural reference images by converting the resolution of the plural reference images acquired by said image acquisition unit to the resolution of the original image acquired by said image acquisition unit.

7. The image synthesizing apparatus according to claim 1, wherein said image conversion unit is operable to extract, from the plural reference images, subregions made up of uniform pixel values from among the subregions in the plural reference images, based on the original image and plural reference images acquired by said image acquisition unit, the subregions corresponding to pixels in the original image, and output the extracted subregions of the plural reference images and the corresponding pixels of the original image;
said conversion coefficient calculation unit is operable to calculate the conversion coefficient based on the subregions in the plural reference images outputted from said image conversion unit and the pixels in the original image.

8. The image synthesizing apparatus according to claim 1, wherein there are three or more reference images, and
said image synthesizing unit is operable to generate the linear-converted image by performing linear combination on the three or more reference images using the conversion coefficient calculated by said conversion coefficient calculation unit.

9. The image synthesizing apparatus according to claim 1, wherein said conversion coefficient calculation unit is operable to calculate, as the conversion coefficient, a coefficient of a linear equation satisfying the relation among three or more pixel values that correspond to one another between the original image and three or more reference images.

10. An image synthesizing apparatus which generates, based on an original image, a synthesized image having a higher resolution than the original image, said apparatus comprising:
a processor operable to (1) acquire the original image and plural reference images, the reference images being obtained by capturing the same object shown in the original image under differing lighting conditions, (2) convert at least one of the resolution of the original image and the resolution of the plural reference images so that the resolution of the acquired original image and the resolution of the plural reference images are the same, (3) calculate, based on the original image and plural reference images converted to the same resolution, a conversion coefficient used in generating the original image by performing linear combination on the plural reference images, and (4) generating the synthesized image by: generating plural converted reference images by converting the resolution of the plural reference images to a target resolution; generating a linear-converted image by performing linear combination on the generated plural converted reference images using the conversion coefficient; and outputting, as the synthesized image, the generated linear-converted image or an adjusted linear-converted image, the adjusted linear-converted image being the linear-converted image which has been adjusted.

11. The image synthesizing apparatus according to claim 10, further comprising:
a camera which captures the original image and the plural reference images;
a storage device which stores the original image and the plural reference images captured by said camera; and
a display device which displays the synthesized image generated by said processor,
wherein said processor acquires the original image and the reference images by reading out the original image and the reference images from said storage device.

12. An image synthesizing method for generating, based on an original image, a synthesized image having a higher resolution than the original image, said method comprising:
acquiring the original image and plural reference images, the reference images being obtained by capturing the same object shown in the original image under differing lighting conditions;
converting at least one of the resolution of the original image and the resolution of the plural reference images so that the resolution of the original image acquired in said acquiring and the resolution of the plural reference images are the same;
calculating, based on the original image and plural reference images converted to the same resolution in said converting, a conversion coefficient used in generating the original image by performing linear combination on the plural reference images; and generating the synthesized image by: generating plural converted reference images by converting the resolution of the plural reference images to a target resolution; generating a linear-converted image by performing linear combination on the generated plural converted reference images using the conversion coefficient calculated in said calculating; and outputting, as the synthesized image, the generated linear-converted image or an adjusted linear-converted image, the adjusted linear-converted image being the linear-converted image which has been adjusted.

13. A computer-readable medium storing a program for an image synthesizing apparatus which generates, based on an original image, as synthesized image having a higher resolution than the original image, said the program causing a computer to execute the steps of the image synthesizing method of claim 12.

* * * * *